(12) United States Patent
Poretti et al.

(10) Patent No.: US 10,447,105 B2
(45) Date of Patent: Oct. 15, 2019

(54) ELECTRICAL FEEDTHROUGH FOR SUBSEA SUBMERSIBLE WELL PUMP IN CANISTER

(71) Applicant: Baker Hughes Incorporated, Houston, TX (US)

(72) Inventors: Arturo L. Poretti, Claremore, OK (US); Ignacio Martinez, Tulsa, OK (US); Ryan P. Semple, Owasso, OK (US); James C. Clingman, Broken Arrow, OK (US); Chad A. Craig, Tulsa, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 343 days.

(21) Appl. No.: 15/381,299

(22) Filed: Dec. 16, 2016

(65) Prior Publication Data

US 2017/0194830 A1    Jul. 6, 2017

Related U.S. Application Data

(60) Provisional application No. 62/275,097, filed on Jan. 5, 2016, provisional application No. 62/287,758, filed on Jan. 27, 2016.

(51) Int. Cl.
*H02K 5/132* (2006.01)
*H02K 11/20* (2016.01)
(Continued)

(52) U.S. Cl.
CPC ......... *H02K 5/132* (2013.01); *F04D 13/0693* (2013.01); *F04D 13/10* (2013.01);
(Continued)

(58) Field of Classification Search
CPC . F04D 13/0693; F04D 13/10; H02K 11/0094; H02K 11/20; H02K 11/25;
(Continued)

(56) References Cited

U.S. PATENT DOCUMENTS

| 6,688,392 B2 | 2/2004 | Shaw |
| 7,059,345 B2 | 6/2006 | Shaw |
| 7,150,325 B2 | 12/2006 | Ireland et al. |
| 7,565,932 B2 | 7/2009 | Lawson |

(Continued)

OTHER PUBLICATIONS

International Search Report and Written Opinion dated Apr. 12, 2017 of corresponding PCT/US2016/067354, 14 pages.

*Primary Examiner* — Emily P Pham
*Assistant Examiner* — Demetries A Gibson
(74) *Attorney, Agent, or Firm* — Bracewell LLP; James E. Bradley (57) ABSTRACT

A subsea pump assembly includes a tubular conduit that has an upstream end plate and an inlet for flowing well fluid into an interior of the conduit. A power cable opening extends through the upstream end plate. An electrical submersible pump and motor are in the interior of the conduit. The motor has a motor assembly housing with an upstream end having an electrical insulator opening. An end connection secures the upstream end to an interior side of the upstream end plate with the insulator opening registering with the power cable opening. An insulated electrical connector is mounted in the insulator opening. A motor wire in the motor assembly housing joins to an inner end of the electrical connector. A power conductor extends from exterior of the conduit through the power cable opening and joins to an outer end of the electrical connector.

18 Claims, 3 Drawing Sheets

(51) Int. Cl.
*H02K 11/00* (2016.01)
*F04D 13/06* (2006.01)
*F04D 13/10* (2006.01)
*H02K 11/25* (2016.01)
*H01R 13/52* (2006.01)
*H02K 5/12* (2006.01)
*H02K 5/10* (2006.01)
*H02K 5/128* (2006.01)

(52) U.S. Cl.
CPC ......... *H02K 11/0094* (2013.01); *H02K 11/20* (2016.01); *H02K 11/25* (2016.01); *H01R 13/521* (2013.01); *H01R 13/5205* (2013.01); *H01R 13/5208* (2013.01); *H02K 5/10* (2013.01); *H02K 5/12* (2013.01); *H02K 5/1285* (2013.01)

(58) Field of Classification Search
CPC ............ H02K 5/132; H02K 5/10; H02K 5/12; H02K 5/1285; H02K 5/13; F04C 13/008; F04C 13/02; H01R 13/5205; H01R 13/5208; H01R 13/521
USPC .......................................................... 310/71
See application file for complete search history.

(56) References Cited

U.S. PATENT DOCUMENTS

| | | | |
|---|---|---|---|
| 7,857,059 B2 | 12/2010 | Shen et al. | |
| 8,066,077 B2 | 11/2011 | Lawson | |
| 8,328,529 B2 | 12/2012 | Thompson et al. | |
| 8,485,797 B2 | 7/2013 | Martinez et al. | |
| 8,905,727 B2* | 12/2014 | Frey | F04B 47/06 417/414 |
| 9,482,233 B2* | 11/2016 | Watson | F04D 13/10 |
| 2009/0068037 A1 | 3/2009 | Shaw et al. | |
| 2010/0329893 A1 | 12/2010 | Martinez et al. | |
| 2010/0329908 A1 | 12/2010 | Martinez et al. | |
| 2011/0024124 A1 | 2/2011 | Brown et al. | |
| 2011/0056699 A1* | 3/2011 | Bjoroy | E21B 43/01 166/369 |
| 2011/0247788 A1* | 10/2011 | Martinez | F04D 13/10 165/104.33 |
| 2013/0098632 A1* | 4/2013 | Wetzel | E21B 43/128 166/373 |
| 2013/0278183 A1* | 10/2013 | Liang | G06F 17/5036 318/400.2 |
| 2013/0306348 A1* | 11/2013 | Holzmueller | H01B 9/02 174/105 R |
| 2014/0335712 A1* | 11/2014 | Semple | E21B 43/128 439/271 |
| 2015/0337843 A1 | 11/2015 | Tanner et al. | |
| 2017/0244294 A1* | 8/2017 | Holzmueller | E21B 43/128 |

* cited by examiner

FIG. 3

ELECTRICAL FEEDTHROUGH FOR SUBSEA SUBMERSIBLE WELL PUMP IN CANISTER

CROSS-REFERENCE TO RELATED APPLICATIONS

This application claims priority to provisional applications 62/275,097 filed Jan. 5, 2016 and 62/287,758 filed Jan. 27, 2016.

FIELD OF THE DISCLOSURE

This disclosure relates in general to electrical submersible well pumps and in particular to an electrical feedthrough connection for a submersible pump installed within a subsea conduit such as a flowline canister or other tubular member. The system can be installed in vertical or horizontal positions, on the seabed, in a dummy well or even over a subsea production tree.

BACKGROUND

Electrical submersible pumps (ESP) are commonly used in wells to pump well fluid being produced by the well. A typical ESP includes a pump driven by an electrical motor. The pump is often a centrifugal pump, but it could be other types.

It is also known to employ an ESP on or near a sea floor to boost the pressure of well fluid flowing from a subsea well. Normally, the ESP is located in a subsea conduit, such as a flowline canister. The conduit has an inlet near one end and an outlet at the opposite end. A power cable or motor lead extends into the conduit and connects to the motor. The motor lead and its electrical connection to the motor are exposed to the well fluid flowing into the conduit. Failures of the electrical connection can occur due to the immersion in the well fluid.

Sensor units are optionally employed with ESPs, particularly with ESPs submersed in wells. Normally, the sensor unit secures to a lower end of the motor. The sensor unit has sensors that sense various parameters of the motor and/or the well fluid. A sensor wire or wires may extend from the motor into the sensor unit for powering the sensors and transmitting signals. The sensor wire may connect to a null point in the windings of the motor to convey the signal over the power cable.

SUMMARY

A subsea pump assembly includes a tubular conduit adapted to be installed subsea, the conduit having a longitudinal axis, an upstream end plate, and an inlet for flowing well fluid into an interior of the conduit. A power cable opening extends through the upstream end plate. An electrical submersible pump (ESP) in the interior of the conduit comprises a motor assembly and a pump. The pump has an intake in fluid communication with the well fluid in the interior of the conduit and a discharge for pumping the well fluid from the conduit. The motor assembly includes a motor assembly housing with an upstream end that secures to an interior side of the upstream end plate over the power cable opening. A power conductor extends through the power cable opening into the upstream end of the motor assembly housing.

An electrical insulator is mounted in the upstream end of the motor assembly housing. An electrical connector is mounted in the insulator. A motor wire within the motor assembly housing joins an inner end of the electrical connector. The power conductor joins an outer end of the electrical connector.

A dielectric liquid is located in the motor assembly housing. A dielectric liquid passage extends from the upstream end of the motor assembly housing into the power cable opening, immersing the power conductor in the dielectric liquid.

An external flange may be on the upstream end of the motor assembly housing to bolt to the upstream end plate. The upstream end of the motor assembly housing is located on a longitudinal axis of the centrifugal pump. In one embodiment, the inlet of the conduit extends through the upstream end plate offset and parallel to the power cable opening and the longitudinal axis of the conduit.

The motor assembly housing includes a motor housing. In one embodiment, a sensor adapter housing secures to the motor housing. The upstream end of the motor assembly housing is located on the sensor adapter housing. In one embodiment, a slot is formed in a sidewall of the sensor adapter housing, the slot being open to the interior of the conduit. A sensor module is secured in the slot. The sensor module has a sensor module axis that is offset from and parallel to a longitudinal axis of the motor housing.

A motor wire passage may extend through the sensor adapter housing offset from and parallel to the longitudinal axis of the motor housing. A motor wire extends from the motor housing through the motor wire passage to the upstream end of the motor assembly housing. The motor housing contains a dielectric liquid that is in fluid communication with the motor wire passage.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about"

includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
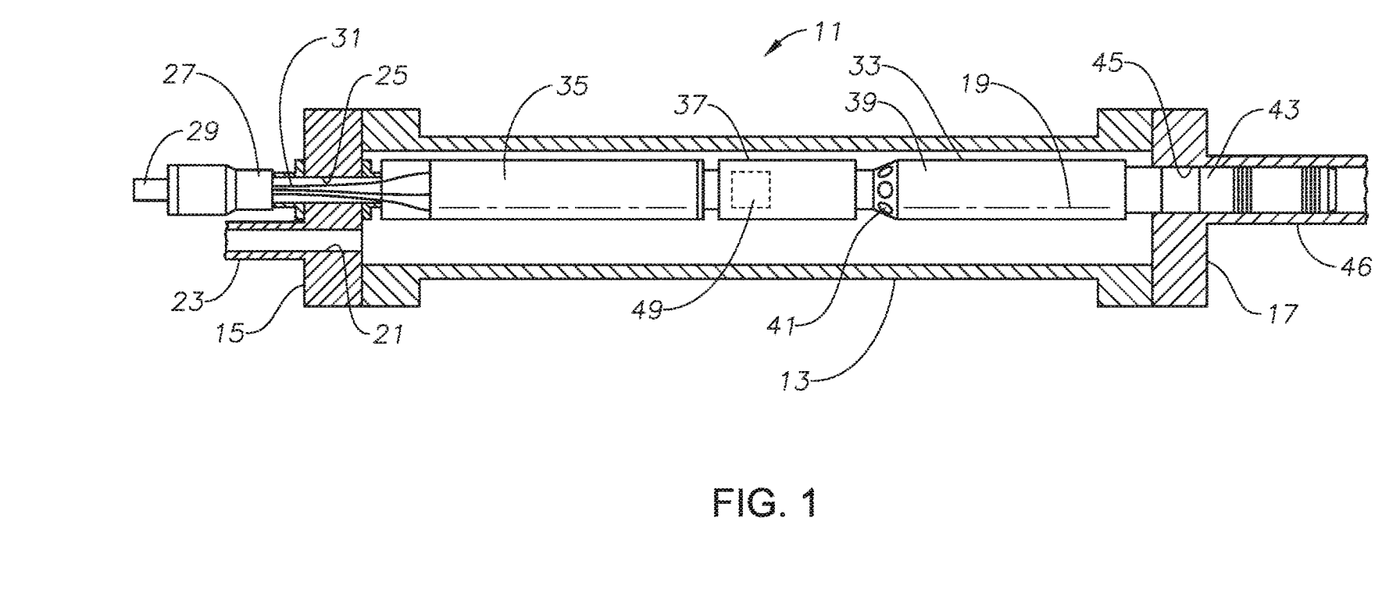
FIG. 1 is a schematic partially sectioned view of a flowline canister and submersible pump assembly in accordance with this disclosure.

Referring to FIG. 1, subsea pump assembly 11 is located at or near the sea floor for boosting the flow rate of well fluid flowing from a subsea well. Subsea pump assembly 11 includes a conduit into which the well fluid flows. The conduit in FIG. 1 is a flowline canister 13 that will be horizontally or vertically positioned at or near a sea floor. Alternately, canister 13 could be a caisson vertically installed in the sea floor in a dummy well, or some other type of housing.

Flowline canister 13 has an upstream end plate 15 and a downstream end plate 17, each of which is normal to an axis 19 of flowline canister 13. Upstream and downstream end plates 15, 17 may be integral with the tubular portion of flowline canister 13, or they may be separate components welded or otherwise secured to the ends of the tubular portion of flowline canister 13. FIG. 1 shows upstream end plate 15 to have an inlet 21 that is offset and parallel to axis 19. A flowline 23 connects to inlet 21 to flow well fluid into the interior of flowline canister 13. Alternately, inlet 21 could be in the cylindrical side wall of flowline canister 13, rather than upstream end plate 15.

A power cable opening 25 also extends through upstream end plate 15. In this example, power cable opening 25 has an axis parallel to and offset from flowline canister axis 19. Alternatively, power cable opening 25 could be coaxial with flowline canister axis 19. An electrical connector, penetrator or subsea termination device 27 seals and secures to the outer side of upstream end plate 15 over power cable opening 25. A power cable, electrical fly lead or subsea umbilical 29 connects to connector 27. Power cable 29 has three power conductors 31, each of which is mechanically and electrically insulated. In this embodiment, all three power conductors 31 extend through connector 27 and power cable opening 25 into the interior of flowline canister 13. Alternately, each power conductor 31 could extend through a separate power cable opening.

Power cable 29 supplies power to an electrical submersible pump (ESP) 33 housed within flowline canister 13. ESP 33 is coaxial with the axis of inlet 21 and in this example offset from flowline canister axis 19. ESP 33 has an electrical motor 35, which is a three phase AC motor. One end of motor 35 couples to a seal section or pressure equalizer 37. The opposite end of seal section 37 couples to a centrifugal pump 39. Alternatively, seal section 37 can be composed of an expansion chamber mounted outside of canister 13. Seal section 37 has one or several mechanical seals and a thrust chamber of rotating and stationary thrust bearings.

Pump 39 has a large number of stages, each stage having an impeller that rotates within a stationary diffuser. Pump 39 has an intake 41 for drawing in well fluid flowing into the interior of flowline canister 13 from upstream flow line 23. Pump 39 has a discharge tube 43, which may be a polished bore receptacle, that extends through and seals within a discharge port 45 in downstream end plate 17. A downstream flowline 46 connects to discharge port 45. Motor 35 has a shaft 47 (FIG. 2) that extends in sections through seal section 37 and pump 39 for rotating the impellers. A thrust bearing 49, schematically illustrated in seal section 37, handles thrust imposed from the operation of pump 39.

Figure 2:
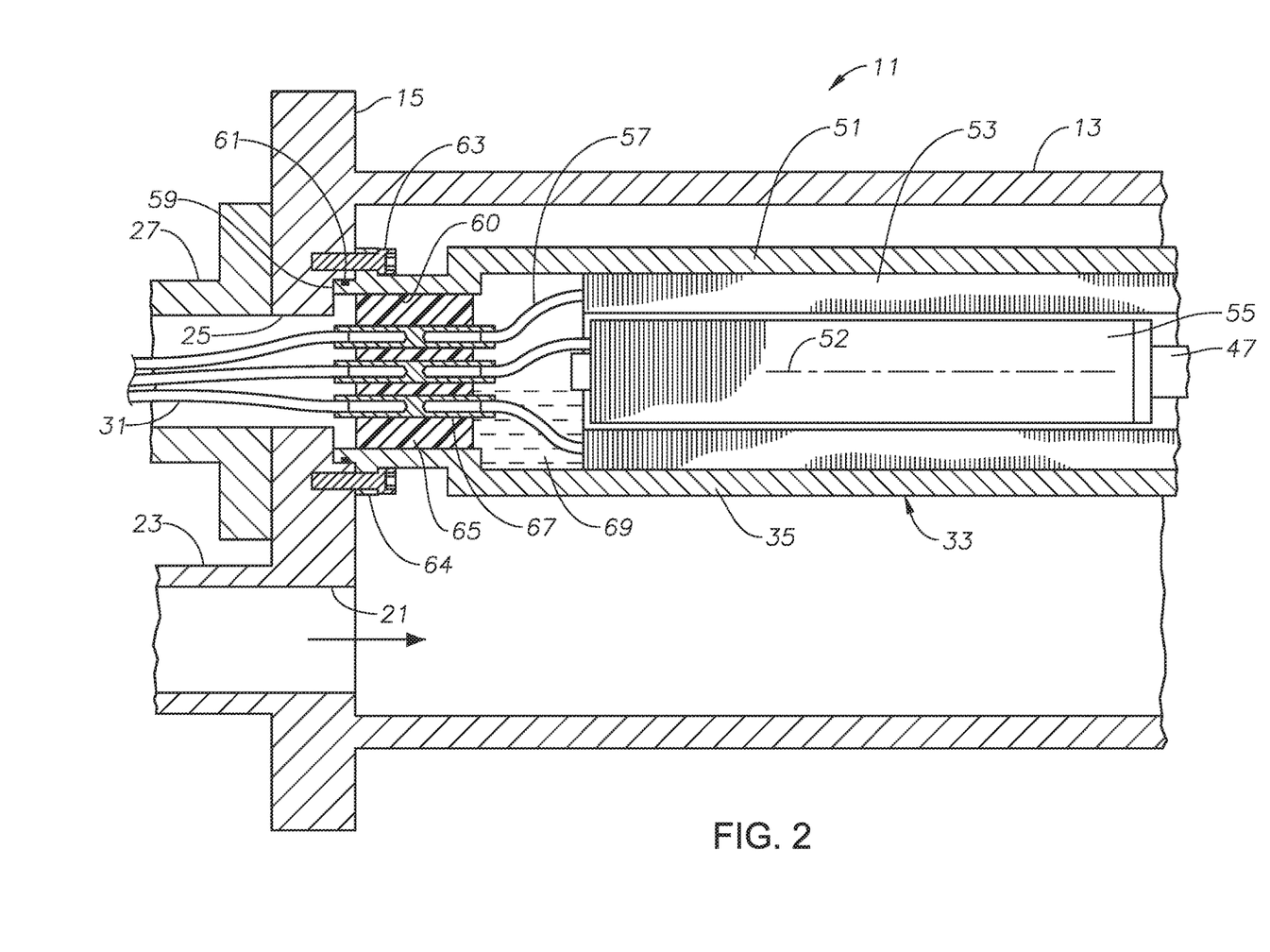
FIG. 2 is an enlarged schematic sectional view of an upstream portion of the flow line canister and pump assembly of FIG. 1.

Referring to FIG. 2, motor 35 includes a tubular motor housing 51 with a motor housing axis 52 concentric with the axis of power cable opening 25. A stator 53 is mounted in motor housing 51 for non rotation. Stator 53 comprises a stack of metal disks or laminations and has an axial bore. Rotor sections 55 (only one shown) mount to shaft 47 for rotation with shaft 47 and are located within the bore of stator 53. Radial bearings (not shown) are located at opposite ends of and spaced along shaft 47 for radially supporting rotor sections 55 within stator 53. Each rotor section 55 is also made up of a plurality of thin metal disks. Each rotor section 55 has axially extending copper rods spaced around shaft 47 that extend through the laminations.

Motor wires 57 wind through slots in the laminations of stator 53 and extend in an upstream direction from stator 53. Motor housing 51 has an upstream end 59 that inserts into the interior side of power cable opening 25 in upstream end plate 15. Motor housing upstream end 59 has a central opening 60 that registers with power cable opening 25. A seal 61 seals the outer diameter of motor housing upstream end 59 to power cable opening 25. Bolts 63 may be employed that extend through an external flange or connection 64 to secure motor housing upstream end 59 to the interior side of upstream end plate 15. Alternative methods can be used to seal and secure motor housing upstream end 59 to the interior side of upstream end plate 15.

Each motor wire 57 electrically connects to one of the power conductors 31. In this example, a single electrical insulator 65 mounts within motor housing upstream end opening 60. Insulator 65 may have a passage (not shown) that communicates a dielectric liquid 69 in the interior of motor housing 51 with power cable opening 25. Optionally, insulator 65 could seal dielectric liquid 69 in motor housing 51. Insulator 65 has a plurality of electrical connector holes extending from its inner side to its exterior side, and a metal electrical connector 67 is secured in each of the holes. Each motor wire 57 is connected to an interior end of one of the electrical connectors 67. Each power conductor 31 is connected to an outer end of one of the electrical connectors 67. Alternatively, motor wires 57 may be long enough to extend out of canister 13 and connect to electrical connectors 67 outside of canister 13.

During installation, ESP 33 may be assembled in flowline canister 13, with motor wires 57 connected to electrical connectors 67 and motor housing upstream end 59 secured to the interior side of upstream end plate 15. Power conductors 31 are connected to electrical connectors 67, and connector 27 is secured to the outer side of upstream end plate 15. No portion of power cable 29 will be exposed to well fluid in the interior of flowline canister 13. The assembly 11 is lowered into the sea. Power cable 29 forms the lower end of a power cable that may be deployed from the surface platform while the assembly 11 is lowered to the sea floor.

In operation, well fluid from a subsea well flows through inlet 21 into the interior of flowline canister 13 as indicated by the arrow in FIG. 2. Power from power cable 29 powers motor 35, which rotates shaft 47 to drive pump 39. Pump 39 draws the well fluid into intake 41 and discharges it into downstream flowline 46. Seal section 37 has a movable element that equalizes the pressure of dielectric liquid 69 within motor housing 51 with the pressure of the well fluid in the interior of flowline canister 13. Alternatively, an expansion chamber outside of canister 13, may equalize the fluid pressure of the dielectric liquid 69 in the interior of motor 35 with the well fluid in the interior of canister 13.

Figure 3:
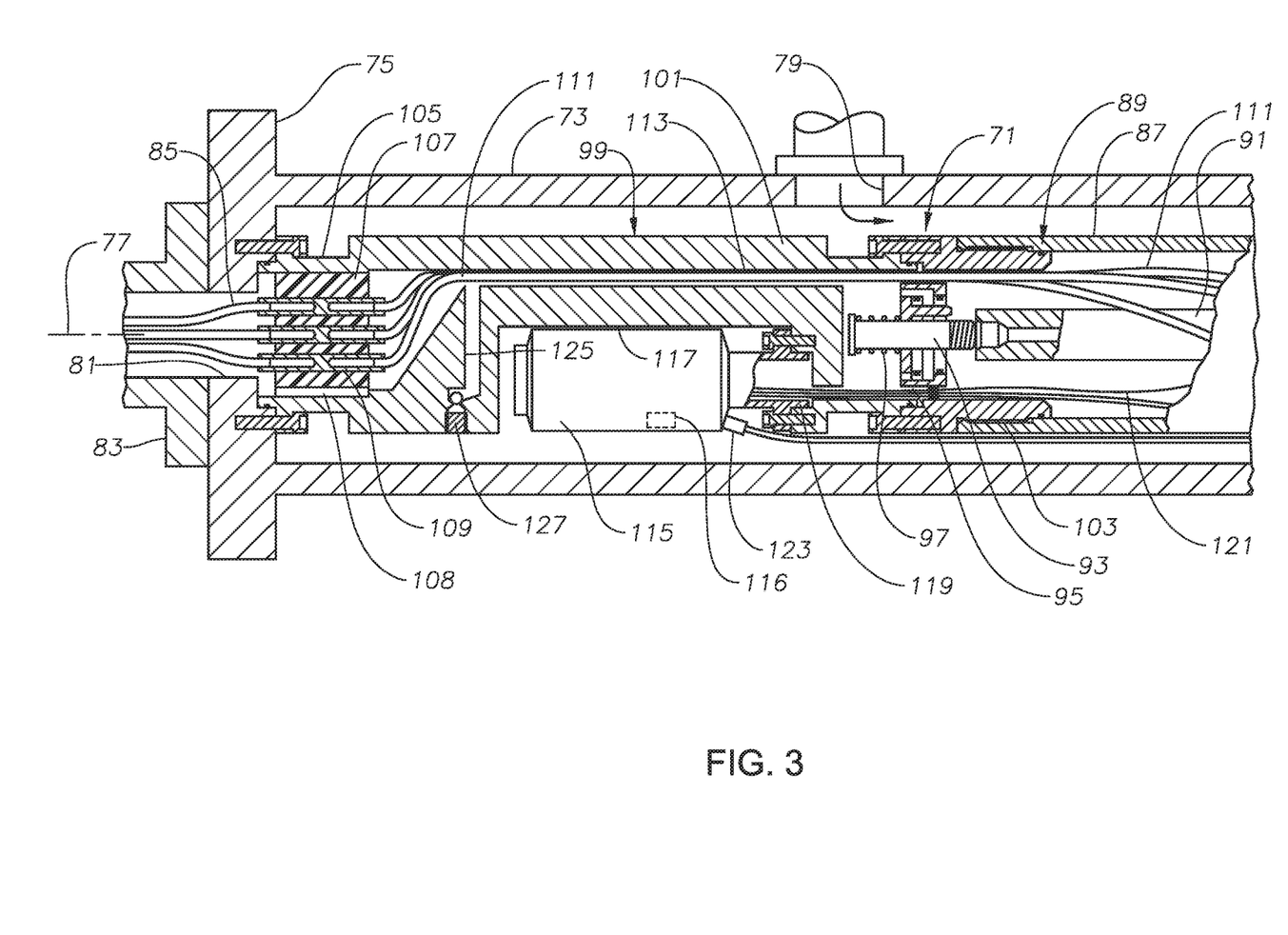
FIG. 3 is a schematic sectional view of an alternate embodiment of a flowline canister and submersible pump assembly in accordance with this disclosure.

In the embodiment of FIG. 3, an ESP 71 is mounted within a canister 73. Canister 73 has an upstream end plate 75 and a longitudinal axis 77. In this example, the axis of ESP 71 coincides with axis 77. A flowline leads to a well fluid inlet 79 that is located in the side wall of canister 73 in this embodiment. One or more power cable openings 81 (one shown) extend through upstream end plate 75. An electrical connector 83 connects to the exterior side of upstream end plate 75 in registry with power cable opening 81. Three power conductors 85 extend from electrical connector 83 through power cable opening 81. Alternately, each power conductor 85 could extend through a separate power cable opening.

ESP 71 includes an electrical motor 87 having a tubular motor housing 89 and a drive shaft 91. In this example, a threaded plug 93 releasably secures into a threaded opening in the non drive or upstream end of drive shaft 91. Plug 93 extends through a hole in a bulkhead 95 that is perpendicular to the axis of motor housing 89. A spring 97 urges plug 93 in an upstream direction relative to bulkhead 95 and shaft 91. When plug 93 is unscrewed from drive shaft 91, spring 97 moves it to the upstream or open position (shown in FIG. 3), causing dielectric liquid within motor housing 89 to flow through the hole in bulkhead 95 in an upstream direction. Plug 93, bulkhead 95 and spring 97 operate functionally the same as shown in US 2015/0337843, which is incorporated by reference.

A sensor sidemount adapter unit 99 has a housing 101 that is schematically illustrated to be single-piece, but in practice will have multiple pieces secured together. Sensor sidemount adapter unit 99 and its housing 101 may be considered to be part of a motor assembly housing along with motor housing 89. Sensor adapter housing 101 has a threaded downstream or motor end 103 that secures to the upstream end of motor housing 89. Sensor adapter housing 101 has an upstream end 105 that bolts to the interior side of end plate 75 over power cable opening 81. A connector insulator 107 fits within upstream end 105. In this example, connector insulator 107 does not seal upstream end 105; rather a dielectric liquid passage 108 extends through connector insulator 107, communicating dielectric fluid in sensor adapter housing 101 and in motor housing 89 with power cable opening 81 and the interior of electrical connector 83.

Motor wires 111 secure to power conductors 85 with electrical connectors 109 installed in connector insulator 107. Motor wires 111 extend through a passage 113 in sensor adapter housing 101 and sealingly through openings in bulkhead 95. Motor wires 111 join windings in the stator (not shown) in motor housing 89.

A sensor module 115 secures to a slot 117 formed in the exterior of sensor adapter housing 101. Slot 117 is elongated along a slot axis parallel to and offset from axis 77 of ESP 71. Slot 117 is open to the exterior of sensor adapter housing 101 so that it is in fluid communication with well fluid flowing through canister 73. Slot 117 isolated from dielectric fluid contained in passage 113 and other portions of the interior of sensor adapter housing 101.

At least one sensors 116 is contained in sensor module 115. One or more of sensors 116 may be exposed to well fluid flowing in canister 73 for measuring pressure and temperature of the well fluid. Other of the sensors 116 may be immersed in dielectric liquid of motor housing 89 to measure pressure and temperature of the dielectric liquid in motor 87. Other sensors 116 in sensor module 115 may measure parameters such as the vibration of motor 87 and the discharge pressure and temperature of the well fluid flowing from the pump of ESP 71.

Sensor module 115 has an upstream neck or end 119 that bolts to a downstream end of slot 117. The interior of neck 119 is open to admit dielectric lubricant from motor 87 into the interior of sensor module 115 after threaded plug 93 is in the open position. Sensor wires 121 extend from the interior of neck 119 into the upstream end of motor housing 89 and sealingly through bulkhead 95. Sensor wires 121 extend through a slot in the motor stator (not shown) and join a null or Y-point (not shown) of the windings of the stator of motor 87. The Y-point is located at the downstream or drive end of motor 87 in this example. Power is supplied to sensor module 115 and signals sent via sensor wires 121. Optionally, a discharge sensor line 123 for monitoring discharge pressure, discharge temperature, or both, secures to sensor module 115. Discharge sensor line 123 extends along the exterior of motor housing 89 and has a downstream end (not shown) that joins the discharge end of the pump of ESP 71. If discharge temperature and pressure are to be sensed, a sensor wire will be used. If only discharge pressure is to be sensed, a capillary tube would be used.

Sensor adapter housing 101 may have a dielectric lubricant fill port 125 leading from the exterior to passage 113. A valve 127 selectively opens and closes fill port 125.

In one method of assembly, motor 87 may be filled via a motor housing fill port (not shown) with dielectric lubricant while threaded plug 93 is in a closed position secured to shaft 91. Sensor adapter housing 101 may be secured to motor housing 89 before or after filling motor 87 with dielectric lubricant. While in the closed position, threaded plug 93 prevents the dielectric lubricant in motor housing 89 from flowing into passage 113 of sensor adapter housing 101 or into sensor module 115. Before completing the installation of ESP 71 in canister 73, technicians also fill sensor adapter housing 101 with dielectric motor fluid via fill port 125 and valve 127.

A technician will then manually rotate drive shaft 93 at the downstream end of seal section 37 (FIG. 1), which unthreads plug 93 from drive shaft 91. Spring 97 forces plug 93 axially to the open position, which provides an annular clearance between plug 93 and a hole in bulkhead 95, allowing communication between dielectric fluid in motor housing 89 with dielectric fluid in the interior of sensor adapter housing 101 and in the interior of electrical connector 83. Power conductors 85 as well as motor wires 111 will be immersed in dielectric fluid during operation and will be isolated from well fluid. During operation, seal section 37 (FIG. 1) equalizes internal dielectric fluid pressure in motor 87 and sensor adapter unit 99 with the well fluid pressure in canister 73.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

The invention claimed is:

1. A subsea pump assembly, comprising:
a canister adapted to be installed subsea, the canister having a longitudinal axis, a cylindrical wall concentric with the longitudinal axis of the canister, an upstream end plate extending transversely across the cylindrical wall, an inlet for flowing well fluid into an interior of the canister, and a discharge port;

a power cable opening extending through the upstream end plate;

an electrical submersible pump (ESP) in the interior of the canister, the ESP comprising a motor assembly and a pump, the motor assembly having a motor shaft, the pump having an intake in fluid communication with the well fluid in the interior of the canister, the pump having a discharge for pumping the well fluid out the discharge port;

the motor assembly having a motor assembly housing with an upstream end having an electrical insulator opening that is upstream from an upstream end of the motor shaft;

an end connection that secures the upstream end of the motor assembly housing to an interior side of the upstream end plate with the electrical insulator opening registering with the power cable opening, the end connection being located on a longitudinal axis of the ESP;

an insulated electrical connector mounted in the electrical insulator opening;

a motor wire in the motor assembly housing joined to an inner end of the insulated electrical connector;

a power cable exterior of the canister and having a power cable connector connected to an outer side of the upstream end plate in registry with the power cable opening;

a power conductor extending from the power cable connector through the power cable opening and joined to an outer end of the insulated electrical connector;

a dielectric liquid in the motor assembly housing; and a dielectric liquid communication path in the motor assembly housing communicating the dielectric liquid in the motor assembly housing with the inner end of the insulated electrical connector.

2. The submersible pump assembly according to claim 1, wherein:

the electrical insulator opening is located on a longitudinal axis of the motor housing assembly.

3. The submersible pump assembly according to claim 1, further comprising:

an external flange on the end connection of the motor assembly housing that bolts to the upstream end plate.

4. The submersible pump assembly according to claim 1, wherein the end connection of the motor assembly housing is located on a longitudinal axis of the centrifugal pump.

5. The submersible pump assembly according to claim 1, wherein the inlet of the canister extends through the upstream end plate offset and parallel to the power cable opening and the longitudinal axis of the canister.

6. The submersible pump assembly according to claim 1, wherein the motor assembly housing comprises a motor housing; and wherein the motor assembly further comprises:

a sensor adapter housing secured to the motor housing; and wherein the upstream end of the motor assembly housing is located on the sensor adapter housing.

7. The submersible pump assembly according to claim 6, further comprising:

a slot in a sidewall of the sensor adapter housing, the slot being open to the interior of the canister; and a sensor module secured in the slot, the sensor module having a sensor module axis that is offset from and parallel to a longitudinal axis of the motor housing.

8. The submersible pump assembly according to claim 6, further comprising:

a motor wire passage extending through the sensor adapter housing offset from and parallel to the longitudinal axis of the motor housing; and the motor wire extends from the motor housing through the motor wire passage to the upstream end of the motor assembly housing.

9. The submersible pump assembly according to claim 8, wherein:

the dielectric liquid in the motor housing assembly is in fluid communication with the motor wire passage.

10. A subsea pump assembly, comprising:

a canister adapted to be installed subsea, the canister having an upstream end plate and a downstream end plate, the upstream end plate and the downstream end plate being normal to a longitudinal axis of the canister, and the canister having an inlet for flowing well fluid into an interior of the canister;

a power cable opening extending through the upstream end plate;

an electrical submersible pump (ESP) in the interior of the canister, the ESP comprising a motor assembly and a pump, the motor assembly having a motor shaft that drives the pump, the pump having an intake in fluid communication with the well fluid in the interior of the canister, the pump having a discharge tube extending through the downstream end plate for pumping the well fluid from the canister;

the motor assembly having a motor assembly housing with an upstream end having an electrical insulator opening that is upstream from the motor shaft;

an end connection that secures the upstream end of the motor assembly housing to an interior side of the upstream end plate with the electrical insulator opening registering with the power cable opening, the end connection being located on a longitudinal axis of the ESP;

an insulated electrical connector mounted in the electrical insulator opening;

a motor wire in the motor assembly housing joined to an inner end of the insulated electrical connector;

a power cable exterior of the canister and having a power cable connector connected to an outer side of the upstream end plate in registry with the power cable opening;

a power conductor extending from the power cable connector through the power cable opening and joined to an outer end of the insulated electrical connector;

a dielectric liquid in the motor assembly housing; and a dielectric liquid communication path in the motor assembly housing communicating the dielectric liquid in the motor assembly housing with the inner end of the insulated electrical connector.

11. The submersible pump assembly according to claim 10, wherein the power cable opening is located on a longitudinal axis of the ESP.

12. The submersible pump assembly according to claim 10, wherein:

the end connection is bolted to the inner side of the upstream end plate; and the end connection has an upstream end that inserts into and seals with the power cable opening.

13. The submersible pump according to claim 10, wherein:
the insulated electrical connector comprises three electrical contacts mounted within an electrical insulator secured within the electrical insulator opening of the end connection.

14. The submersible pump assembly according to claim 10, wherein the end connection comprises:
an external flange on the upstream end of the motor assembly housing that fastens to the upstream end plate; and
a seal ring on the end connection that encircles the electrical insulator opening and seals the upstream end of the motor assembly housing to the upstream end plate.

15. The submersible pump assembly according to claim 10, wherein the motor assembly housing comprises a motor housing; and wherein the motor assembly further comprises:
a sensor unit having at least one sensor, the sensor unit being secured to the motor housing; and wherein
the upstream end of the motor assembly housing is located on the sensor unit.

16. A subsea pump assembly, comprising:
a tubular conduit adapted to be installed subsea, the tubular conduit having a longitudinal axis and an inlet for flowing well fluid into an interior of the tubular conduit;
an upstream end plate secured to an upstream end of the tubular conduit normal to the longitudinal axis of the tubular conduit;
a power cable opening extending through the upstream end plate;
an electrical submersible pump (ESP) in the interior of the tubular conduit, the ESP comprising a motor and a pump, the pump having an intake in fluid communication with the well fluid in the interior of the tubular conduit, the pump having a discharge for pumping the well fluid from the tubular conduit;
a sensor unit connected to the motor and having at least one sensor, the sensor unit having an upstream end with an electrical insulator opening;
an end connection on the sensor unit that secures the upstream end of the sensor unit to an interior side of the upstream end plate with the insulator opening registering with the power cable opening;
an insulated electrical connector mounted in the insulator opening;
a motor wire in the motor assembly housing extending through the sensor unit and joined to an inner end of the electrical connector;
a power conductor extending from exterior of the tubular conduit through the power cable opening and joined to an outer end of the electrical connector;
wherein the sensor unit comprises:
a sensor adapter housing having a sidewall containing an elongated slot that is open to the interior of the tubular conduit; and
a sensor module secured in the slot, the sensor module having a sensor module axis that is offset from and parallel to a longitudinal axis of the sensor adapter housing, the sensor being mounted in the sensor module.

17. The submersible pump assembly according to claim 16, further comprising:
a motor wire passage extending through the sensor unit to the insulator opening, the motor wire extending through the motor wire passage;
a dielectric liquid in the motor; and
wherein the dielectric liquid in the motor is in fluid communication with the motor wire passage.

18. The submersible pump assembly according to claim 16, wherein the motor wire passage extends alongside the slot parallel to and offset from the sensor module axis.

* * * * *

UNITED STATES PATENT AND TRADEMARK OFFICE
CERTIFICATE OF CORRECTION

PATENT NO. : 10,447,105 B2
APPLICATION NO. : 15/381299
DATED : October 15, 2019
INVENTOR(S) : Arturo L. Poretti et al.

It is certified that error appears in the above-identified patent and that said Letters Patent is hereby corrected as shown below:

In the Specification

In Column 5, Line 4, reads:
"motor 35 with the well fluid in the interior of canistor 13"
It should read:
"motor 35 with the well fluid on the exterior of canistor 13";

In Column 5, Line 59, reads:
"flowing through canister 73. Slot 117 isolated from dielectric"
It should read:
"flowing through canister 73. Slot 117 is isolated from dielectric";

In Column 5, Line 62, reads:
"At least one sensors 116 is contained in sensor module"
It should read:
"At least one sensor 116 is contained in sensor module"; and In Column 5, Line 64, reads:
"fluid flowing through in canister 73 for measuring pressure"
It should read:
"fluid flowing through canister 73 for measuring pressure".

Signed and Sealed this
First Day of June, 2021

Drew Hirshfeld
*Performing the Functions and Duties of the*
*Under Secretary of Commerce for Intellectual Property and*
*Director of the United States Patent and Trademark Office*